US008085974B2

(12) United States Patent
Dvorkin et al.

(10) Patent No.: US 8,085,974 B2
(45) Date of Patent: Dec. 27, 2011

(54) METHOD FOR DETERMINING ELASTIC-WAVE ATTENUATION OF ROCK FORMATIONS USING COMPUTER TOMOGRAPIC IMAGES THEREOF

(75) Inventors: Jack Dvorkin, Redwood City, CA (US); Naum Derzhi, Sugarland, TX (US); Zbigniew Wojcik, Houston, TX (US)

(73) Assignee: Ingrain, Inc., Houston, TX (US)

( * ) Notice: Subject to any disclaimer, the term of this patent is extended or adjusted under 35 U.S.C. 154(b) by 661 days.

(21) Appl. No.: 12/276,952

(22) Filed: Nov. 24, 2008

(65) Prior Publication Data

US 2010/0128982 A1 May 27, 2010

(51) Int. Cl.
*G06K 9/00* (2006.01)
*A61B 6/00* (2006.01)

(52) U.S. Cl. .......................... 382/100; 382/154; 378/21

(58) Field of Classification Search .................. 382/100, 382/106–109, 131, 154, 162, 165, 168, 170, 382/173, 181, 189–194, 199, 221, 224, 232, 382/254, 274, 276, 285–292, 294, 305, 312; 175/17, 249; 703/9; 702/16; 378/21, 53; 324/303; 367/14
See application file for complete search history.

(56) References Cited

U.S. PATENT DOCUMENTS

| 5,877,995 | A  | * | 3/1999  | Thompson et al. | ............. | 367/14  |
| 6,516,080 | B1 | * | 2/2003  | Nur             | ............. | 382/109 |
| 6,742,603 | B2 | * | 6/2004  | Polizzotti et al.| ............. | 175/17  |
| 6,807,487 | B2 | * | 10/2004 | Khan            | ............. | 702/16  |
| 6,933,719 | B2 | * | 8/2005  | Thomann et al.  | ............. | 324/303 |
| 7,869,565 | B2 | * | 1/2011  | Wood et al.     | ............. | 378/53  |
| 7,933,757 | B2 | * | 4/2011  | Awwiller        | ............. | 703/9   |
| 8,011,454 | B2 | * | 9/2011  | Castillo        | ............. | 175/249 |

FOREIGN PATENT DOCUMENTS

WO 2005/108965 A1 11/2005

OTHER PUBLICATIONS

Oren et al., Numerical Simulations of NMR Responses for Improved Interpretations of NMR Measurements in Reservoir Rocks, SPE paper 77398, Sep. 2002.
Arns et al., Computation of linear elastic properties from micrographic images: Methodology and agreement between theory and expreiment, Geophysics, vol. 67, No. 5, Sep.-Oct. 2002.
Fredrich et al., Predicting Macroscopic Transport Properties Using Microscopic Image Data, J. Geophysical Research, vol. 111, B03201, Mar. 2006.

(Continued)

*Primary Examiner* — Seyed Azarian
(74) *Attorney, Agent, or Firm* — Kilyk & Bowersox, P.L.L.C.

(57) ABSTRACT

A method for estimating at least one elastic-wave-related property of a porous material from a sample thereof includes making a three dimensional tomographic image of the sample of the material. The image is segmented into pixels each representing pore space or rock grain. Bulk modulus and shear modulus of the porous material are determined from the segmented image at a frequency corresponding to mobile fluid. Bulk modulus and shear modulus of the porous material are determined from the segmented image at a frequency corresponding to immobile fluid. The at least one elastic-wave-related property is determined from the mobile fluid and immobile fluid moduli. The method includes at least one of storing and displaying the at least one elastic-wave-related property so determined.

11 Claims, 4 Drawing Sheets

OTHER PUBLICATIONS

Auzerais et al., Transport in Sandstone: A Study Based on Three Dimensional Microtomography, Geophysical Research Letters, vol. 23, No. 7, Apr. 1996.

Arns, et al., Digital Core Laboratory: Petrophysical Analysis from 3D Imaging of Core Fragments, Petrophysics, vol. 46, No. 4, Aug. 2005.

Saenger et al, Finite Difference Modeling of Wave Propagation on Microscale: A Snapshot of the Work in Progress, Geophysics vol. 72, No. 5, Sep.-Oct. 2005.

Bugani et al, "Investigating morpholgical changes in treated vs. untreated stone building materials by x-ray micro-CT", Anal Boiannal. Chem (2008); 391.1343-1350.

Felipuissi et al, Measuring Statistical Geometric Properties of Tomographic Images of Soils, IEEE Trnasactions on Instrumentation and Measurement v. 57, No. 11.

E. Galluci et al., "3D experimental investogation of the microstructure of cement pastes . . . ", Cement and Concrete Research 37 (2007) 360-368.

De Graef et al, "A sensititvity study for the visualization of bacterial weathering of concrete and stone . . . " Science of the Total Environment 341 (2005) 173-183.

Jones et al., "Chracterization of methane hydrate host sediments using synchrotron-computer miccrtotomography,"J. Petr. Sci. and Eng. 56 (2007) 136-145.

International Search Report and the Written Opinion of the International Searching Authority issued in corresponding International Patent Application No. PCT/US2009/065430 mailed Oct. 7, 2011 (13 pages).

Madadi et al., "3D Imaging and Simulation of Elastic Properties of Porous Materials," Computing in Science and Engineering, vol. 11, No. 4, Jul. 1, 2009, pp. 65-73.

Sakellariou et al., "Developing a virtual materials laboratory," Materials Today, vol. 10, No. 12, Dec. 1, 2007, pp. 44-51.

Youssef et al., "High Resolution Ct and Pore? Network Models to Assess Petrophysical Properties of Homogeneous and Heterogeneous Carbonates," SPE/EAGE Reservoir Characterization and Simulation Conference, No. 111427, Oct. 29, 2007, pp. 1-12.

Knackstedt et al., "Digital Core Laboratory: Properties of reservoir core derived from 3D images," SPE Asia Pacific Conference on Integrated Modelling for Asset Management, No. 87009, Mar. 29, 2004, pp. 1-14.

Masad et al., "Computations of permeability tensor coefficients and anisotropy of asphalt concrete based on microstructure simulation of fluid flow," Computational Materials Science, vol. 40, No. 4, Sep. 14, 2007, pp. 449-459.

Jones et al., "Non-destructive quantitative 3D analysis for the optimisation of tissue scaffolds," Biomaterials, vol. 28, No. 7, Dec. 22, 2006, pp. 1404-1413.

Laschet et al., "Microstructure based model for permeability predictions of open-cell metallic foams via homogenization," Materials Science and Engineering A: Structural Materials: Properties, Microstructure and Processing, vol. 472, No. 1-2, Dec. 7, 2007, pp. 214-226.

Gallucci et al., "3D experimental investigation of the microstructure of cement pastes using synchrotron X-ray microtomography (muCT)," Cement and Concrete Research, vol. 37, No. 3, Feb. 22, 2007, pp. 360-368.

Ketcham et al., "Nondestructive high-resolution visualization and measurement of anisotropic effective porosity in complex lithologies using high-resolution X-ray computed tomography," Journal of Hydrology, vol. 302, No. 1-4, Feb. 1, 2005, pp. 92-106.

\* cited by examiner

METHOD FOR DETERMINING ELASTIC-WAVE ATTENUATION OF ROCK FORMATIONS USING COMPUTER TOMOGRAPIC IMAGES THEREOF

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of estimating material properties of porous media. More specifically, the invention relates to methods for estimating such properties using computer tomographic (CT) images of porous media such as subsurface rock formation.

2. Background Art

Estimating material properties such as effective elastic moduli and attenuation of the elastic waves has substantial economic significance. Methods known in the art for identifying the existence of subsurface hydrocarbon reservoirs, including seismic surveying and well log analysis, need to be supplemented with reliable methods for estimating how fluids disposed in the pore spaces of the reservoir rock formations affect the elastic and attenuating properties of the rock to aid in interpretation of such surveys.

One method known in the art for estimating fluid transport properties is described in U.S. Pat. No. 6,516,080 issued to Nur. The method described in the Nur patent includes preparing a "thin section" from a specimen of rock formation. The preparation typically includes filling the pore spaces with a dyed epoxy resin. A color micrograph of the section is digitized and converted to an n-ary index image, for example a binary index image. Statistical functions are derived from the two-dimensional image and such functions are used to generate three-dimensional representations of the rock formation. Boundaries can be unconditional or conditioned to the two-dimensional n-ary index image. Desired physical property values are estimated by performing numerical simulations on the three-dimensional representations. For example, permeability is estimated by using a Lattice-Boltzmann flow simulation. Typically, multiple, equiprobable three-dimensional representations are generated for each n-ary index image, and the multiple estimated physical property values are averaged to provide a result.

In performing the method described in the Nur patent, it is necessary to obtain samples of the rock formation and to prepare, as explained above, a section to digitize as a color image. Economic considerations make it desirable to obtain input to fluid transport analysis more quickly than can be obtained using prepared sections. Recently, devices for generating CT images of samples such as drill cuttings have become available. Such CT image generating devices (CT scanners) typically produce three-dimensional gray scale images of the samples analyzed in the scanner. Such gray scale images can be used essentially contemporaneously as drill cuttings are generated during the drilling of a wellbore through subsurface rock formations.

Using images of samples of rock formations it is possible to obtain estimates of petrophysical parameters of the imaged rock sample, for example, porosity, permeability, shear and bulk moduli, and formation resistivity factor.

Seismic (or elastic) waves attenuate as they propagate through rock formations in the Earth's the subsurface. Attenuation means that the amplitude (of stress or deformation) of such waves decreases as the wave travels a certain distance through the rock formations. A formal definition of attenuation is as follows.

An attenuation coefficient $\alpha$ is defined as the exponential decay coefficient of an elastic wave:

$$A(x) = A_0 \exp[-\alpha x] \tag{1}$$

where A is the amplitude of the elastic wave; $A_0$ is the original (unattenuated) wave amplitude; and x is the distance traveled by the elastic wave.

Another important quantity related to attenuation is the inverse quality factor $Q^{-1}$, which is related to $\alpha$ by the expression:

$$Q^{-1} = \alpha V/\pi f, \tag{2}$$

where V is the velocity (speed) of the elastic wave and f is its frequency.

Knowing attenuation is important for purposes of seismic imaging of the Earth's subsurface. Attenuation information is used during seismic processing to equalize the magnitude of a seismic signal at varying distances from the seismic energy source. Recently, it has been also used to better delineate formations with hydrocarbons. Typically, attenuation is larger in gas- or oil-bearing subsurface formations than in rock formations having only water in the pore spaces thereof (called "wet rock"). To quantify the interpretation of such effects and improve seismic imaging, a quantitative estimate of attenuation ($Q^{-1}$) is desirable for a given type of formation.

A traditional method of measuring attenuation is in a laboratory where a physical sample of the rock formations of interest is placed between a sound source (transducer) and an acoustic receiver. An elastic impulse is generated by the transducer and its arrival is detected by the receiver. The amplitudes of both, the input acoustic energy ($A_0$) and the detected acoustic energy (A(L)), are measured. Then $Q^{-1}$ can be calculated from Equations (1) and (2) by the expression:

$$Q^{-1} = -\frac{1}{L}\frac{V}{\pi f}\ln\frac{A(L)}{A_0}, \tag{3}$$

where L is the length of the acoustic energy path through the rock sample. Other methods of calculating $Q^{-1}$ from a physical experiment are known in the art.

To better understand the methodology of the present invention, it is important to describe the physical nature of attenuation of elastic waves.

Seismic energy dissipates in porous rock with fluid in the pore spaces due to wave-induced oscillatory cross-flow of the pore fluid. The viscous-flow friction irreversibly transfers part of the acoustic energy into heat. This cross-flow can be especially strong in partially saturated rock (rock having a combination of oil, and/or gas and water in the pore spaces) where the viscous fluid phase (water) moves in and out of, e.g., gas-saturated pore space. Such viscous friction losses may also occur in wet rock where elastic heterogeneity is present. Deformation due to a stress wave is relatively strong in the softer portion of the pore space of rock and is weak in the stiffer portion. The spatial heterogeneity in the deformation of the solid rock formation "frame" forces the fluid to flow between the softer and stiffer portions of the rock. Such cross-flow may occur at all spatial scales. Such cross-flow is known in the art as "squirt-flow." Microscopic "squirt-flow" is developed at the sub-millimeter pore scale because a single pore may include compliant crack-like and stiff equi-dimensional parts.

It is important to understanding this invention to understand a link between attenuation and the elastic moduli of porous rock. Both attenuation and the elastic moduli are frequency-dependent. If the frequency of the elastic wave is low, the deformation of the pore space is relatively slow. Slow pore space deformation means that the pore fluid can freely travel between the soft and stiff pores without resisting wave-induced deformation. The elastic moduli at low frequency are thus relatively low. If the frequency of the elastic wave is very high, however, the pore fluid cannot freely travel between the soft and stiff pores because the rate of wave-induced deformation is high and the fluid is relatively viscous (as related to the wave frequency). This means that at high frequency, the soft and stiff pores are in effect hydraulically disconnected. The fluid in the soft pores has no space to move and, therefore, resists the deformation as the equivalent of an elastic (rather than fluid) body. This effect makes the elastic moduli at high frequency relatively high.

It appears that $Q^{-1}$ reaches a maximum at intermediate frequencies, these frequencies generally believed to occur at the transition from the low-frequency to high-frequency pore fluid behavior, as described above. The transition point ("transition frequency") is essentially impossible to obtain other than using complex laboratory experiments on samples of the rock because of the very complex pore geometry of the natural pore space.

There exists a need to use images such as the foregoing CT scan images to estimate certain elastic-wave-related properties of rock formations, in particular the maximum $Q^{-1}$.

SUMMARY OF THE INVENTION

A method for estimating at least one elastic-wave-related property of a porous material from a sample thereof according to one aspect of the invention includes making a three dimensional tomographic image of the sample of the material. The image is segmented into pixels each representing pore space or rock grain. Bulk modulus and shear modulus of the porous material are determined from the segmented image at a frequency corresponding to mobile fluid. Bulk modulus and shear modulus of the porous material are determined from the segmented image at a frequency corresponding to immobile fluid. The at least one elastic-wave-related property is determined from the mobile fluid and immobile fluid moduli. The method includes at least one of storing and displaying the at least one elastic-wave-related property so determined.

Other aspects and advantages of the invention will be apparent from the following description and the appended claims.

DETAILED DESCRIPTION

The description of this invention is made with reference to using drill cuttings obtained during the drilling of a wellbore through subsurface formations. It should be clearly understood that drill cuttings is only one example of samples of rock formation that may be used with the present invention. Any other source of a rock formation sample, e.g., whole cores, sidewall cores, outcrop quarrying, etc. may provide suitable samples for analysis using methods according to the invention. Consequently, the invention is not limited in scope to analysis of drill cuttings.

Figure 1:
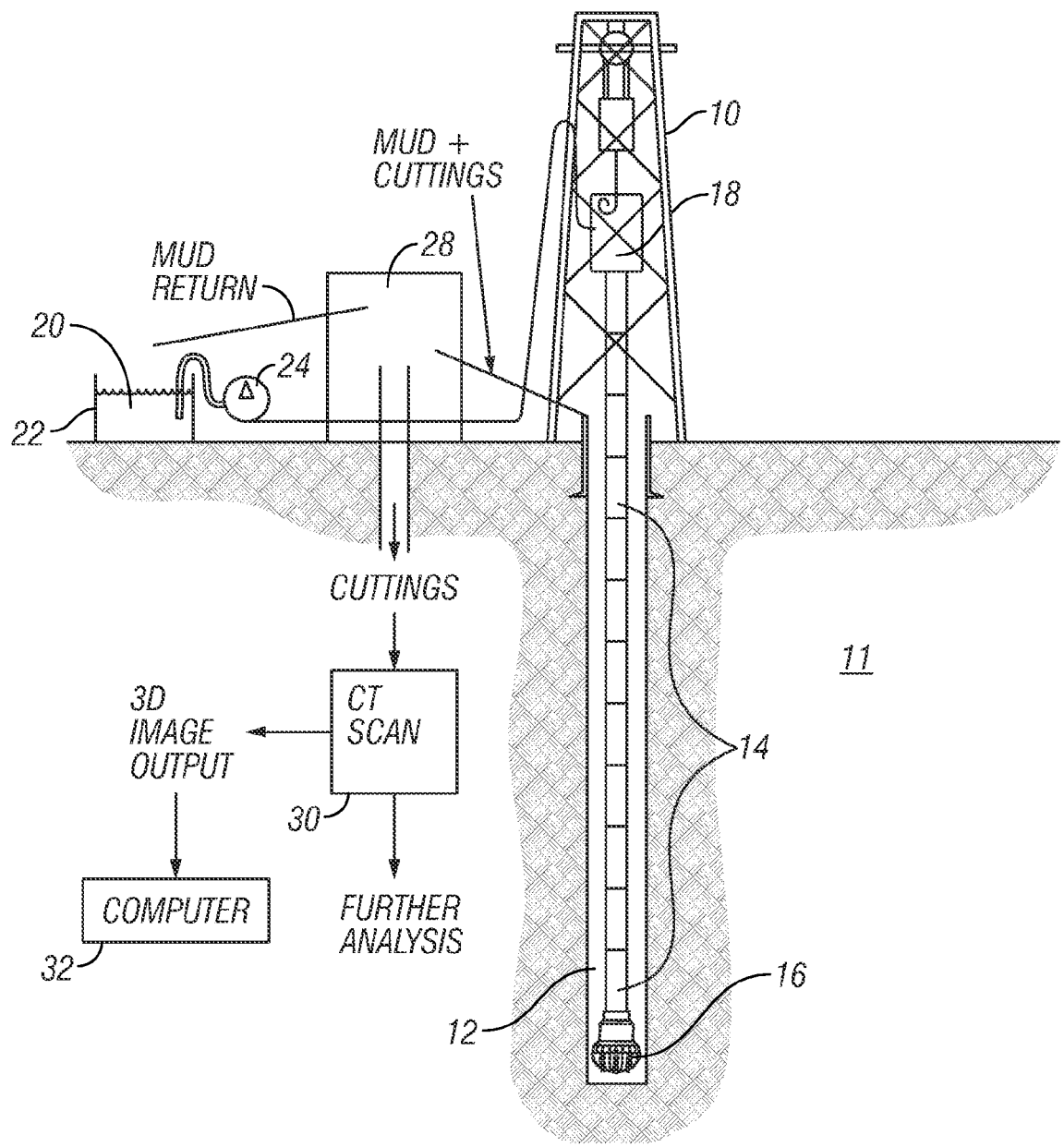
FIG. 1 shows an example of obtaining cuttings during drilling of a wellbore and analysis thereof during the drilling.

An example of drilling a wellbore to obtain samples of rock formations for evaluation by examples of a method according to the invention will be explained with reference to FIG. 1. A drilling unit or "rig" 10 is disposed at the Earth's surface. The rig 10 includes lifting equipment (not shown separately) for raising and lowering one of several types of device used to rotate a drill string 14. The device, shown at 18 in the present example may be a top drive, although the use of a top drive is not a limit on the scope of the invention. The drill string 14 is assembled by threadedly coupling segments of drill pipe end to end. A drill bit 16 is disposed at the lower end of the drill string 14 and cuts through subsurface rock formations 11 to form a wellbore 12. During the drilling of the wellbore 12, the rig 10 is operated to cause some of the axial load (weight) of the drill string 14 to be applied to the drill bit 16. The top drive 18 rotates the drill string 14 and the drill bit 16 at the lower end thereof. The combination of axial load and rotation causes the drill bit 16 to cut through the formations 11.

The rig 10 includes a tank or pit 22 having drilling fluid ("mud") 20 stored therein. A pump 24 lifts the mud 20 and discharges it through suitable flow lines 26 so that the mud 20 passes through an internal passage in the drill string 14, whereupon it is discharged through suitable orifices or courses in the drill bit 16. The discharged mud 20 cools and lubricates the drill bit 16 and lifts the cuttings generated by the bit 16 to the Earth's surface. The cuttings and mud thus lifted enter separation and cleaning devices, shown generally at 28 and including, for example, devices known as "degassers" and "shale shakers" to remove the cuttings and contamination from the mud 20. The mud after such cleaning is returned to the pit 22 for subsequent use in drilling the wellbore 12.

In the present example, the cuttings removed from the separation and cleaning device 28 may be transported to a computer tomographic ("CT") scanner 30, which may use x-rays for analysis of internal structure of the cuttings, for generation of three dimensional (3D) images of the cuttings. The images so generated may be in numerical form and their content will be further explained below. After CT scanning, the cuttings may be saved for further analysis or may be suitably discarded. An example of a suitable CT scanner for making images usable with methods according to the invention is sold under model designation MicroXCT Series 3D tomographic x-ray transmission microscope by Xradia, Inc., 5052 Commercial Circle, Concord, Calif. 94520.

In some examples, an analysis of the cuttings from the CT scan images may provide, substantially in real time during the drilling of the wellbore, an estimate of certain properties of the subsurface formations being drilled, for example elastic moduli and attenuation due to the presence of one or more constituent fluids in the pore spaces of the rock formations 11. In the present example, images generated by the CT scanner 30 may be transferred to a computer 32 having program instructions for carrying out image analysis and subsequent formation property modeling as described below.

It should also be understood that drill cuttings are only one type of rock sample that may be analyzed according to the invention. In other examples, the drill bit 16 may be an annular type configured to drill whole cores of the rock formations 11. In other examples, percussion sidewall core samples may be obtained during drilling or when the drill string 14 is withdrawn from the wellbore 12 such as for "wireline" well evaluation techniques. Also as explained above, rock samples may be obtained from sources other than a wellbore. Accordingly, the scope of the invention is not limited to analysis of drill cuttings or other samples obtained from a wellbore.

CT scan imaging of a porous material sample (e.g., a sample of rock formation) is used in the method to produce a numerical object that represents the material sample digitally in the computer 32 for subsequent numerical simulations of various physical processes, such as viscous fluid flow (for permeability estimation); stress loading (for the effective elastic moduli and attenuation); electrical current flow (for resistivity); and pore size distribution for nuclear magnetic resonance relaxation time properties, including distribution of relaxation time. In some examples, such analysis can be performed while drilling operations are underway, substantially in real time.

The CT scan image produced by the CT scanner 30 may be a 3D numerical object consisting of a plurality of 2D sections of the imaged sample. Each 2D section consists of a grid of values each corresponding to a small region of space defined within the plane of the grid. Each such small region of space is referred to as a "pixel" and has assigned thereto a number representing the image darkness (or for example the density of the material) determined by the CT scan procedure. The value ascribed to each pixel of the 2D sections is typically an integer that may vary between zero and 255 where 0 is, e.g., pure white, and 255 is pure black. Such integer is typically referred to as a "gray scale" value. 0 to 255 is associated with eight digital bits in a digital word representing the gray scale value in each pixel. Other gray scale ranges may be associated with longer or shorter digital words in other implementations, and the range of 0 to 255 is not intended to limit the scope of the invention. For the purpose of simulating a physical process using such a numerical object (the gray scale), however, the numerical object is preferably processed so that all the pixels allocated to the void space in the rock formation (pore space) are represented by a common numerical value, e.g., by only 255s, and all the pixels associated with the rock matrix (or rock grains) are represented by a different numerical value, for example, zeroes. The foregoing process is called image segmentation. Subsequently, the resulting numerical object can be normalized so that the pore spaces are represented by, for example, ones and the rock grains are represented by zeroes. The foregoing may be described as converting the image into a binary index. In other examples, the image may be converted into an index having any selected number, n, of indices.

A technique known in the art for segmenting a gray-scale object is called "thresholding", where all pixels having a gray scale value below a selected threshold value (e.g., a gray scale value of 150 on a scale of 0 to 255) are identified as grains, while all other pixels are identified as pore space. The foregoing approach is often not satisfactory, however, because, due to numerical clutter in an unprocessed CT scan image, some pixels physically located inside a grain may have the gray level of the pore space and vice versa. In the invention, a type of image segmentation known as "region growing" can be used. Region growing may be described as follows. Consider a 2D section of a CT scan image made of a porous rock formation such as sandstone, which has primarily quartz rock grains. A substantial number of "seeds" (each seed consists of one or more pixels having a similar pixel gray scale level, e.g., 250±5) is placed within the image. All pixels within a seed are assigned the same gray scale level which may be an average (e.g., arithmetic) of the gray levels of all the pixels within the seed. The seeds in the image frame do not overlap spatially. Next, two or more adjacent seeds are merged and are identified as a "region" if the gray scale levels of the adjacent seeds have gray scale values within a selected difference threshold of each other. Each identified region is assigned a uniform (fixed) gray level, which can be a weighted average of the gray scale values of all the seeds that have been merged into the identified region. The foregoing process continues for all regions thus formed in the image frame. As a result, the unprocessed CT image is transformed into internally uniform regions plus unclassified pixels that were not assigned to any of the identified regions (because such pixels included gray scale values outside the allocation threshold criteria). Each of such unclassified pixels can be assigned to an adjacent region with the closest gray scale level. If the resulting number of regions is greater than two, however, the foregoing method simply fails to allocate the CT image correctly into grains and pores.

To address the foregoing problem with extending ("growing") seeds into regions, in the invention, instead of using seeds having different gray scale values, only two classes of seeds are used: all pixels having a gray scale value below a selected initial limit for the gray scale level of rock grains (e.g., 60) are classified as rock grains; and all pixels in which the gray scale level is larger than a selected initial limit for pore spaces (e.g., 130) are classified as pore space. One simple way of specifying these initial limits is by selecting the gray scale levels corresponding to the peaks of a gray level histogram. In many subsurface formations, such a histogram will be bimodal, wherein one mode value will correspond to the gray scale level of pores, and another mode value will correspond to the gray scale level of rock grains.

The next element in image classification according to the invention is to grow each of the two initially formed seeds by allocating to such seeds all adjacent pixels having gray scale levels within a selected tolerance, e.g., 130−5 for pore spaces and 60+5 for rock grains. The foregoing process can continue by incrementally increasing the gray scale lower limit for rock grains and incrementally reducing the gray scale upper limit for pore spaces until the two limits meet. The result is that all pixels will be allocated to either pore space or to rock grains, thus providing a fully segmented image.

A possible advantage of the foregoing procedure is that instead of forming multiple regions, the foregoing technique grows only two distinctive regions from start to end, thus avoiding the situation where multiple distinctive regions appear and then have to be reclassified into either pores or grains. If the resulting segmented image appears noisy (cluttered), it can be smoothed by any of conventional filters.

A schematic outline of the foregoing procedure follows. First is to preprocess the original image using the median or 2D Gaussian kernel filter. The size of the filter is provided by the user and should depend on, among other factors, the quality of the image (level of noise). It should be noted that the image segmenting procedure that follows has been demonstrated to be sufficiently noise resistant as to make the preprocessing frequently unnecessary.

Next, two user-selected thresholds, $t_1$ and $t_2$, are selected to determine initial regions for pore space and rock grains, respectively. The initial thresholds may be selected, for example, by analysis of a histogram of the gray scale values in the CT image. For every pixel $p_i$ having a gray scale level represented by $B(p_i)$:

if $B(p_i) > t_1$ then $p_i$ is identified as pore space; and
if $B(p_i) < t_2$ then $p_i$ is identified as rock grain.

If there are two or more contiguous pixels in any subset of the image frame that are classified according to the threshold procedure above, such contiguous pixels may be referred to as "clusters." All of the pixels allocated as explained above then become the image seeds from which region growing proceeds.

Finally, for each pixel classified as a pore, its eight neighbors (spatially contiguous pixels) in the 2D image plane are interrogated. If any of the interrogated neighbor pixels is not already identified as pore or rock grain, and the gray scale level of such pixel is within a preselected tolerance level of (or initially selected different between) the gray scale level assigned to the "pore" seed (as in Step 2 above), the interrogated neighbor pixel is then classified as a pore and is allocated to the "pore" cluster.

The foregoing contiguous pixel interrogation is also performed for pixels classified as rock grain. Contiguous, previously unallocated pixels having gray scale level within a preselected tolerance of the gray scale level of the rock grain seed are allocated to the rock grain cluster.

The foregoing cluster allocation and region growing process continues for both pore space and rock grain until all the pixels in the 2D image frame are interrogated. If any of the pixels is not classified as pore space or rock grain, the foregoing tolerance value for each of the pore space and the rock grain may be increased by a selected increment (for example five gray scale numbers), and the contiguous pixel interrogation and classification may be repeated. The foregoing tolerance increase and repeated adjacent pixel interrogation may be repeated until all or substantially all the pixels in the 2D image frame are allocated to either rock grain or pore space.

The foregoing region growing procedure is then repeated for each 2D image frame in the 3D CT scan image. The result is a three dimensional characterization of the pore structure of the rock samples on which CT imaging has been performed.

Figure 2:
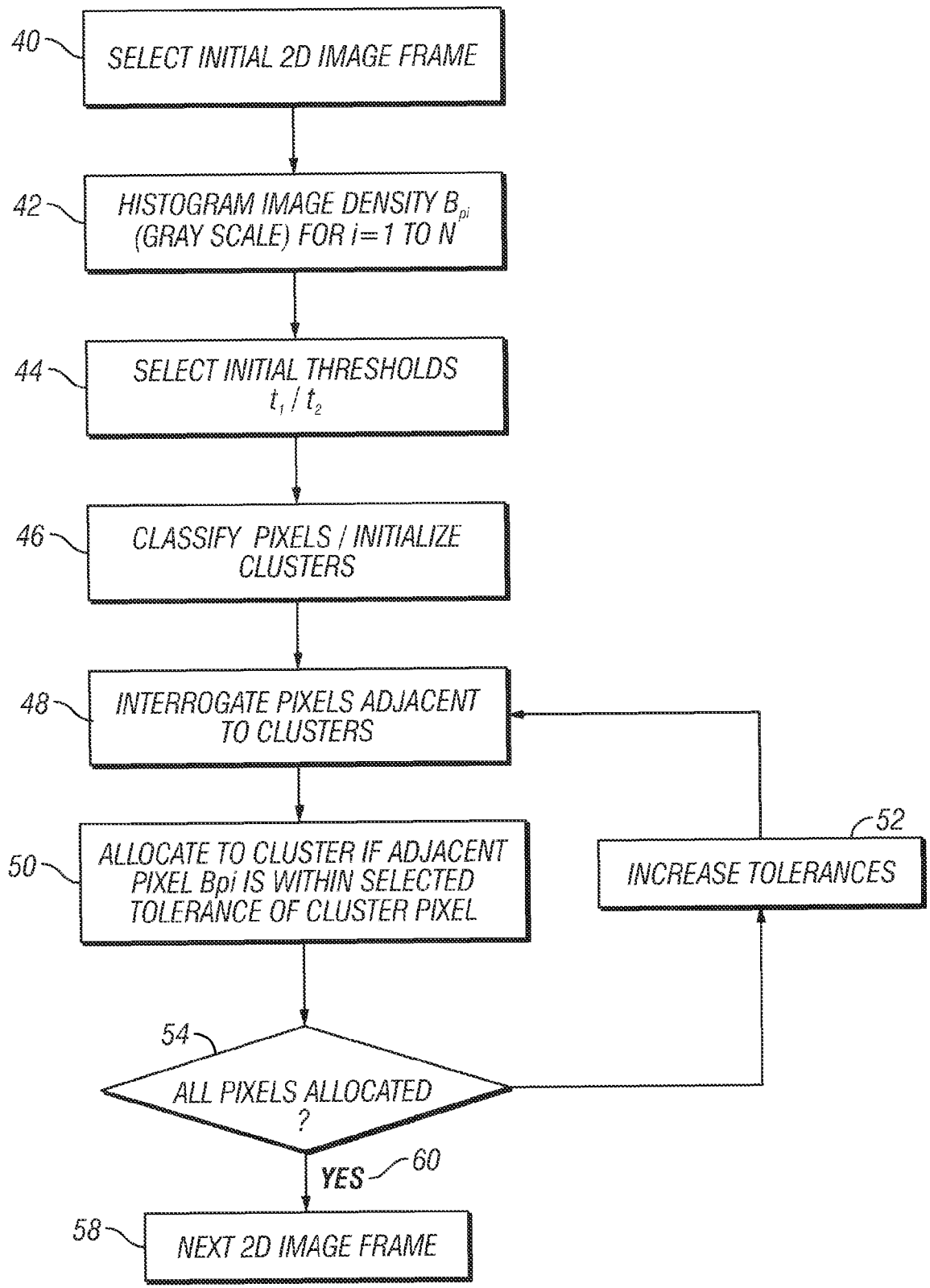
FIG. 2 shows a flow chart of an example process for CT image segmentation.

An example implementation of the above process for image segmentation is shown in a flow chart in FIG. 2. At 40, a 2D image frame of a CT scan image is selected. The image frame may be subjected to histogram analysis, at 42 to determine possible mode values of gray scale for pore spaces and for rock grains. At 44, the possible modes of the histogram may be used to set initial values for the image segmentation thresholds $t_1$ and $t_2$. At 46, using the initial segmentation thresholds, all pixels in the image frame are interrogated may be are allocated to pore space or to rock grains, depending on whether the gray scale value in each pixel exceeds the respective segmentation threshold. The allocated pixels are then segmented into seeds where two or more contiguous pixels are allocated to either pore space or rock grain. At 48, pixels adjacent to the each of the seeds are interrogated. Previously unallocated pixels having a gray scale value falling within an initially selected threshold difference (or tolerance) of the adjacent cluster pixel gray scale value are allocated to the seed at 50. At 54, the image frame is interrogated to determine if all or substantially all the image frame pixels have been allocated to either pore space or rock grain. At 54, the number of allocated pixels is counted and at 60 if all or substantially all the pixels in the image frame have been allocated, a new 2D image frame can be selected, at 58, and the above process repeated. Typically the next 2D image frame will be adjacent to the most recently analyzed 2D image frame. The above process can be repeated until all available 2D image frames have been analyzed. If all pixels in the image frame have not been allocated, at 52, the tolerance or difference threshold values used at 50 may be increased and the interrogation of pixels adjacent to the existing seeds can be repeated, at 48, and the remainder of the process can be repeated.

The result of the foregoing procedure is a segmented 3D image of the rock sample including image elements for rock grain and for pore space. Such image can be stored or displayed in a computer (e.g., 32 in FIG. 1) and can be used as input to one or more rock property characterization methods as will be further explained below.

As explained in the Background section herein, an important parameter of porous rock formations is the maximum value of inverse quality factor $Q^{-1}$, which is believed to occur approximately at the transition frequency from fluid (or relaxed) behavior of fluid in the rock pore space to elastic (or unrelaxed) behavior of the fluid in the rock pore space.

It is possible to estimate the maximum possible vale of $Q^{-1}$ ($Q_{max}^{-1}$) for both compressional (P) and shear (S) waves by the expressions:

$$Q_{P\,max}^{-1} = \frac{M_\infty - M_0}{2\sqrt{M_0 M_\infty}}, \; Q_{S\,max}^{-1} = \frac{G_\infty - G_0}{2\sqrt{G_0 G_\infty}}, \quad (4)$$

where M is the compressional modulus, which is related to the bulk (K) and shear (G) moduli of the rock formation by the expression $M=K+4\,G/3$; the subscript "0" corresponds to the modulus at very low frequency (well below the transition frequency); and the subscript "∞" corresponds to the modulus at very high frequency (well above the transition frequency).

In a first element of a method of the invention, the values of $M_0$, $M_\infty$, $G_0$, and $G_\infty$ are determined from an image (e.g., the 3 dimensional CT image segmented as explained above) and then estimates the values of $Q_{P\,max}^{-1}$ and $Q_{S\,max}^{-1}$ in wet rock using equation (4) above.

Beginning with a segmented 3D image, e.g., obtained as explained above with reference to FIG. 2, it is possible to estimate or determine the elastic bulk modulus and shear modulus by, for example, using finite element analysis ("FEA"). A first calculation is for the bulk and shear moduli of a "dry" rock formation (that is, having no fluids or other materials in the pore spaces). Dry rock estimates of the moduli may be obtained setting both the bulk and shear moduli of the material in the pore space equal to zero. Then, using the segmented image, the method includes FEA calculation of the low-frequency bulk modulus ($K_0$) in "wet rock" from the dry-rock bulk modulus ($K_{Dry}$) using Gassmann's fluid substitution. "Wet rock" is a porous rock formation having water or solutions of brine filling the pore spaces of the rock. Using the same segmented image, the low-frequency shear modulus $G_0$ can be set equal the dry-rock shear modulus $G_{Dry}$. The low-frequency compressional modulus $M_0$ can be calculated using the expression $M_0=K_0+4\,G_0/3$.

Next, the shear and bulk moduli above the transition frequency can be determined for a "wet" formation (pore spaces fully saturated with water) by setting both the bulk modulus of the pore fluid to a given value (e.g., 2.60 GPa for saturated brine) and maintaining the shear modulus of the pore fluid at zero. Because of the nature of finite element elastic calculations, the pore fluid in this case is computationally treated as an elastic body with zero shear modulus. As a result, these calculations provide the "high frequency" moduli, $M_\infty$ and $G_\infty$.

$M_0$, $M_\infty$, $G_0$, and $G_\infty$ are used in Equation (4) to obtain $Q_{P\,max}^{-1}$ and $Q_{S\,max}^{-1}$.

In a particular example, in a quartz-based rock with porosity 0.20 (20 percent), P-wave velocity about 3.90 km/s, and S-wave velocity about 2.45 km/s, using the above technique the moduli are determined to be $M_0=35.31$ GPa, $M_\infty=38.65$ GPa, $G_0=13.94$ GPa, and $G_\infty=16.01$ GPa. The foregoing values when substituted into Equation (4) provide maximum compression and shear inverse quality factors of $Q_{P\,max}^{-1}=0.045$ and $Q_{S\,max}^{-1}=0.069$, respectively, which are consistent with experimental data in similar composition, water-saturated rock formations.

Many laboratory experiments show that in porous rock formations having hydrocarbons in the pore spaces, the compressional maximum inverse quality factor $Q_{P\,max}^{-1}$ depends on the water saturation $S_w$ (the fractional volume of the rock pore space occupied by water; generally the hydrocarbon saturation is equal to $[1-S_w]$), while the shear maximum inverse quality factor $Q_{S\,max}^{-1}$ does not depend on water saturation and is approximately the same as it is in wet rock.

The low frequency bulk modulus $K_0$ in "partially saturated" rock (formations having a combination of water and hydrocarbon in the pore spaces) can be obtained using Gassmann's fluid substitution in dry rock with the fluid's bulk modulus ($K_f$) calculated by the expression:

$$K_f = [S_w K_w^{-1} + (1-S_w) K_h^{-1}]^{-1} \quad (5)$$

where $K_f$ is the bulk modulus of the water/hydrocarbon mixture, $K_w$ is the bulk modulus of water (or brine, depending on water salinity), and $K_h$ is the bulk modulus of hydrocarbon (oil or gas). The compressional modulus at low frequency is determinable by the expression $M_0 = K_0 + 4\,G_0/3$.

The high-frequency behavior of rock with hydrocarbon is governed by the so-called "patchy saturation" model, which assumes that the water and hydrocarbon coexist in patches that do not communicate hydraulically due to the high frequency of the wave-induced deformation. The high frequency compressional modulus $M_\infty$ in the presence of patchy saturation is provided by the expression:

$$M_\infty = \left( \frac{S_w}{M_{S_W=1}} + \frac{1-S_w}{M_{S_W=0}} \right)^{-1} \quad (6)$$

In Equation (6), $M_{S_w=1}$ is the compressional modulus of wet rock and can be calculated from the dry-rock bulk and shear moduli and the bulk modulus of water by using Gassmann's fluid substitution, as described earlier herein. $M_{S_w=0}$ is the compressional modulus of the same rock but with the pore space completely filled with hydrocarbon. Once again, it can be obtained from the dry-rock bulk and shear moduli and the bulk modulus of the hydrocarbon (e.g., 0.10 GPa for gas) by using Gassmann's fluid substitution.

Having calculated $M_0$ and $M_\infty$, Equation (4) can be used to calculate $Q_{P\,max}^{-1}$ at any given water saturation $S_w$. Water saturation may be determined, for example, from well log analysis and other techniques known in the art.

The foregoing method estimates $Q_{P\,max}^{-1}$ at $S_w=1$. To obtain the final value of $Q_{P\,max}^{-1}$ at $S_w<1$, the wet-rock $Q_{P\,max}^{-1}$ is added to that calculated for $S_w<1$ using the above routine. $Q_{S\,max}^{-1}$ is the same in wet and partially saturated rock, as explained above.

Consider the rock sample used in the example given for wet rock and assume that $S_w=0.7$ and $K_h=0.1$ GPa. Equation (5) gives $K_f=0.31$ GPa. The bulk modulus of rock at low frequency is 12.09 GPa (compare to the dry-rock bulk modulus 11.52 GPa). The corresponding compressional modulus $M_0$ is 30.67 GPa (compare to 30.10 in dry rock).

Once again, by using Gassmann's fluid substitution, $M_{S_w=1}=35.31$ GPa and $M_{S_w=0}=30.33$ GPa. By substituting the foregoing values into Equation (6) and for $S_w=0.7$, and $M_\infty=33.65$.

Finally, from Equation (4) $Q_{P\,max}^{-1}=0.046$. To estimate the actual P-wave inverse quality factor, the foregoing value is added to the value 0.045 obtained in the wet rock earlier. The final result for $Q_{P\,max}^{-1}$ in rock containing gas and water is 0.091, which is about twice the P-wave maximum inverse quality factor in wet rock.

Figure 3:
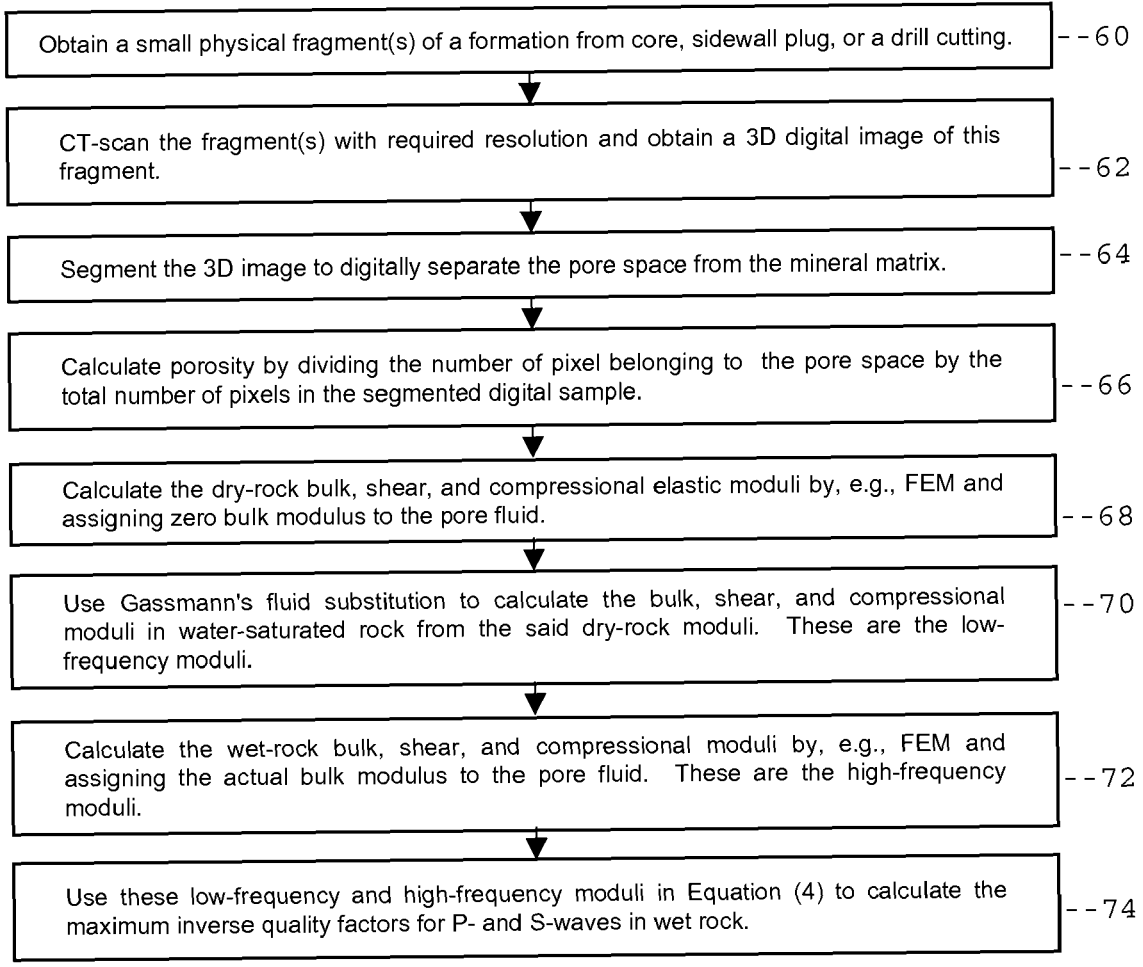
FIG. 3 shows a flow chart of one example process for image analysis.

A flow chart showing an example procedure according to the invention for wet rock will now be explained with reference to FIG. 3. At 60, a sample of rock formation to be analyzed is obtained. Drill cuttings may be used as explained with reference to FIG. 1, or any other sample type may be used, e.g., whole drilled cores, sidewall percussion cores, outcrop specimens, etc. At 62, a CT image of the sample is made, as explained with reference to FIG. 1. At 64, the image is segmented, using, for example, the method explained with reference to FIG. 2. At 66, porosity may be calculated using the pixels assigned to rock matrix and pore space in the segmenting procedure. At 68, a dry rock value for each of bulk, shear and compressional moduli may be obtained as explained above, by setting the bulk modulus and shear modulus of the materials in the pore space equal to zero. Such modulus determination may be performed, for example, using finite element analysis as explained above. At 70, the bulk, shear and compressional moduli may be calculated for water or brine saturated rock using, for example, Gassmann's fluid substitution method. The foregoing moduli calculated using, for example, the Gassmann fluid substitution are the low frequency (movable fluid) moduli. At 72, the actual value of the fluid bulk modulus is assigned to the material in the rock pore spaces, and the pore space material is assumed to behave elastically (i.e., as a non-movable material). FEA may be repeated to determine bulk, shear and compressional moduli of the rock formation in the presence of elastic material in the pore spaces of the rock formation. The foregoing moduli are the "high frequency: moduli. At 74, the low frequency and high frequency moduli determined at 70 and 74 may be used in Equation (4) to determine maximum inverse quality factors for shear and compressional acoustic waves in the sample rock formation.

Figure 4:
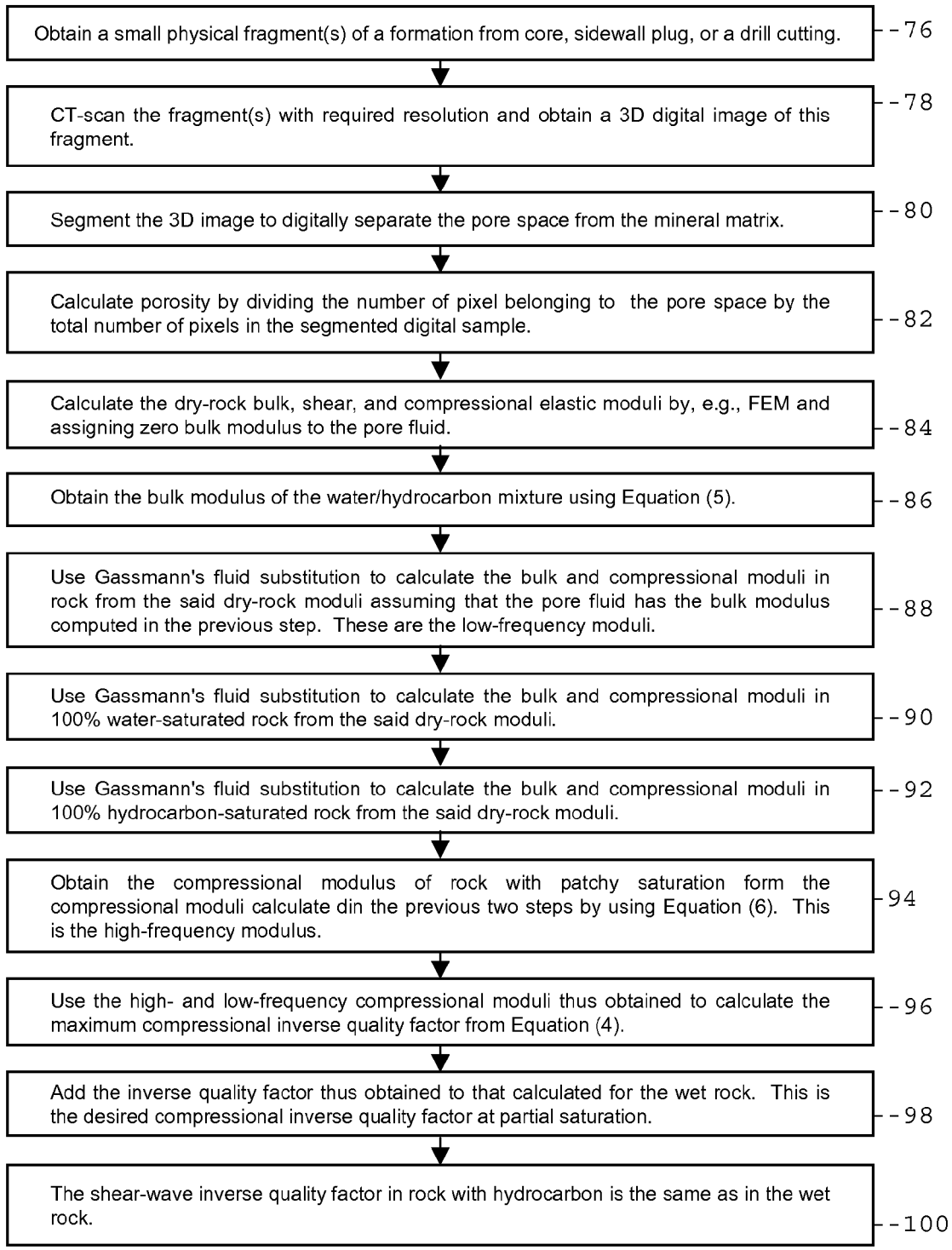
FIG. 4 shows a flow chart of another example process for image analysis.

For partially hydrocarbon saturated formations, an example process will be explained with reference to FIG. 4. At 76, a sample of the formation is obtained, similarly as explained above with reference to 60 in FIG. 3. Also at 78, 80, and 82, respectively, the sample may be CT imaged, the image segmented and the porosity determined, as explained with reference to 62, 64 and 66 in FIG. 3. At 84, the dry rock moduli may be obtained, for example, by FEA as explained above with reference to FIG. 3. At 86, the bulk modulus of a hydrocarbon and/or water mixture may be obtained using Equation (5). At 88, the foregoing mixture bulk modulus may be used with Gassmann's fluid substitution to determine the low frequency moduli of the rock formation sample using the dry rock moduli determined at 86. At 90, the bulk modulus of water in the mixture may be used with Gassmann's fluid substitution to determine the "wet rock" moduli using the dry rock moduli determined at 86. At 92, the bulk modulus of the hydrocarbon may be used with Gassmann's fluid substitution to determine the hydrocarbon saturated values of the same moduli. At 94, the compressional modulus of the rock sample having "patchy saturation" may be determined using the compressional moduli determined using Equation (6) and the fluid filled rock moduli determined at 90 and 92. The patchy saturation moduli thus determined are the high frequency moduli. At 96, the low frequency moduli determined at 86 and the high frequency moduli determined at 96 are used in Equation (4) to determine maximum value of the inverse quality factor (shear and compressional). At 98, the patchy saturation value of inverse quality factor determined at 96 is added to the "wet rock" value of compressional inverse quality factor determined for wet rock (e.g., at 74 in FIG. 3). The result is the value of compressional maximum inverse quality factor for partially water saturated rock of the particular rock sample under investigation. At 100, it is noted that the value of shear maximum inverse quality factor is substantially unrelated to the water saturation.

Methods according to the invention may enable determining formation inverse quality factor and related elastic-wave attenuation properties of a rock formation using images obtained from small samples of the rock formation. Such methods may reduce the need to expensive, time consuming laboratory experiments and enable determination of such rock properties even while a wellbore is being drilled through the formations of interest.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for estimating at least one elastic-wave-related property of a porous material from a sample thereof, comprising:
   making a three dimensional tomographic image of the sample of the material;
   segmenting the image into pixels each representing pore space or rock grain;
   determining bulk modulus and shear modulus of the porous material from the segmented image at a frequency corresponding to mobile fluid;
   determining bulk modulus and shear modulus of the porous material from the segmented image at a frequency corresponding to immobile fluid;
   determining the at least one elastic-wave-related property from the mobile fluid and immobile fluid moduli, wherein the at least one elastic-wave-related property comprises maximum inverse quality factor for shear elastic waves or maximum inverse quality factor for compressional elastic waves or both; and
   at least one of storing and displaying the at least one elastic-wave-related property.

2. The method of claim 1 wherein the tomographic image comprises a value of gray scale allocated to each of a plurality of pixels in the image.

3. The method of claim 2 wherein the segmenting comprises:
   (a) determining an initial gray scale threshold for each of pore space and rock grain;
   (b) allocating each pixel in the image to pore space or rock grain for each pixel meeting threshold criteria for each of the pore space and rock grain thresholds, respectively;
   (c) interrogating pixels adjacent to each seed;
   (d) allocating the interrogated adjacent pixels previously not allocated to a seed to the pore space seed or the rock grain seed based on threshold criteria; and
   (e) repeating (c) and (d) until substantially all pixels in the image are allocated to the rock grain or the pore space.

4. The method of claim 3 wherein the determining initial gray scale thresholds comprises histogram analysis of the tomographic image.

5. The method of claim 3 wherein the allocating interrogated adjacent pixels comprises determining a difference between a gray scale value and a gray scale value of the adjacent pixel in the seed, and allocating the interrogated pixel to the seed if the difference falls below a selected threshold.

6. The method of claim 5 further comprising:
   determining whether unallocated pixels exist in the image;
   increasing the selected difference threshold; and
   repeating the interrogating adjacent and allocating the interrogate pixels having gray scale values wherein the difference is below the increased difference threshold.

7. The method of claim 1 wherein the material comprises a rock formation.

8. The method of claim 1 further comprising determining bulk and shear moduli for immobile fluid and mobile fluid for the rock formation in the presence of at least partial hydrocarbon saturation in pore spaces thereof, and determining a maximum inverse quality factor for the rock formation in the presence of partial hydrocarbon saturation of the pore spaces thereof.

9. The method of claim 1 wherein the determining the bulk and shear moduli for mobile fluid comprises determining bulk and shear moduli for the rock formation wherein no material is disposed in pore spaces thereof, and using Gassmann's fluid substitution to estimate the bulk and shear moduli in the presence of mobile fluid in the pore spaces.

10. The method of claim 1 wherein the determining the bulk and shear moduli for immobile fluid comprises using a bulk modulus for water or brine solutions thereof in pore spaces of the rock formation.

11. The method of claim 1 wherein the determining the mobile fluid moduli and the immobile fluid moduli comprises performing finite element analysis of the segmented image.

* * * * *

UNITED STATES PATENT AND TRADEMARK OFFICE
CERTIFICATE OF CORRECTION

| | | |
|---|---|---|
| PATENT NO. | : 8,085,974 B2 | Page 1 of 1 |
| APPLICATION NO. | : 12/276952 | |
| DATED | : December 27, 2011 | |
| INVENTOR(S) | : Dvorkin et al. | |

It is certified that error appears in the above-identified patent and that said Letters Patent is hereby corrected as shown below:

Title page item 54
IN THE TITLE:

Line 4, "TOMOGRAPIC" should read --TOMOGRAPHIC--.

Signed and Sealed this
Tenth Day of April, 2012

David J. Kappos
*Director of the United States Patent and Trademark Office*

UNITED STATES PATENT AND TRADEMARK OFFICE
CERTIFICATE OF CORRECTION

PATENT NO.         : 8,085,974 B2                                              Page 1 of 1
APPLICATION NO.    : 12/276952
DATED              : December 27, 2011
INVENTOR(S)        : Dvorkin et al.

It is certified that error appears in the above-identified patent and that said Letters Patent is hereby corrected as shown below:

Title page item 54 and at Column 1, line 4,
IN THE TITLE:

"TOMOGRAPIC" should read --TOMOGRAPHIC--.

This certificate supersedes the Certificate of Correction issued April 10, 2012.

Signed and Sealed this
First Day of May, 2012

David J. Kappos
*Director of the United States Patent and Trademark Office*